Jan. 18, 1927.　　　　　　　　　　　　　　1,615,131
C. L. NEIN
DUMP BODY
Filed July 15, 1925　　　2 Sheets-Sheet 1
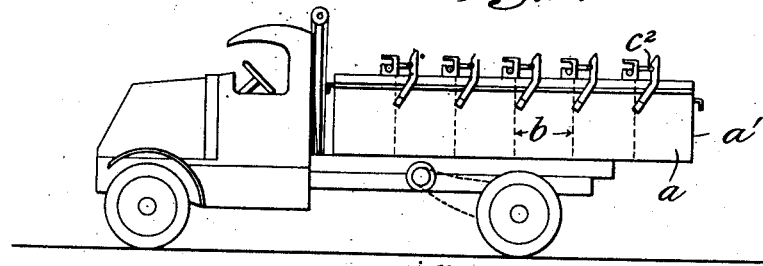
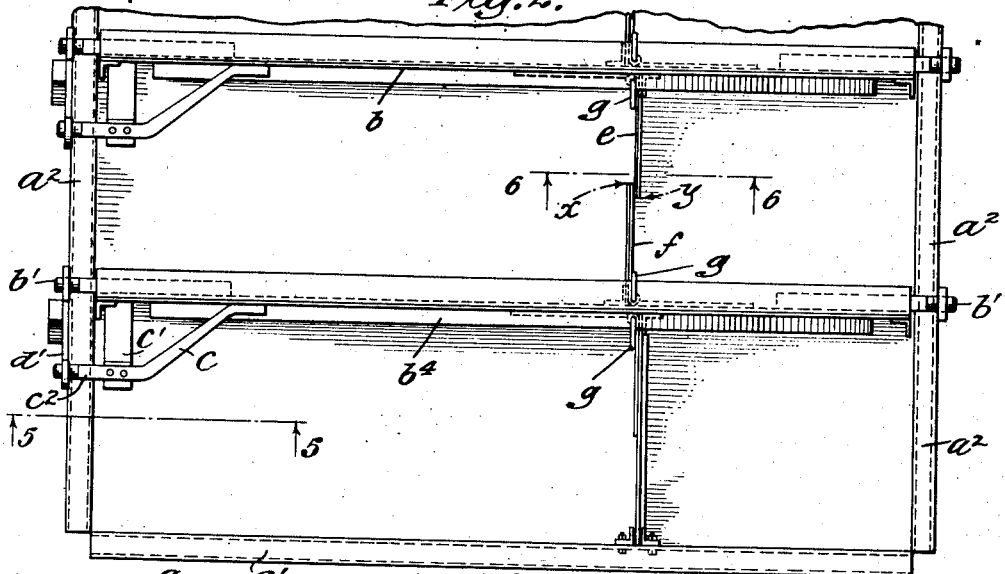
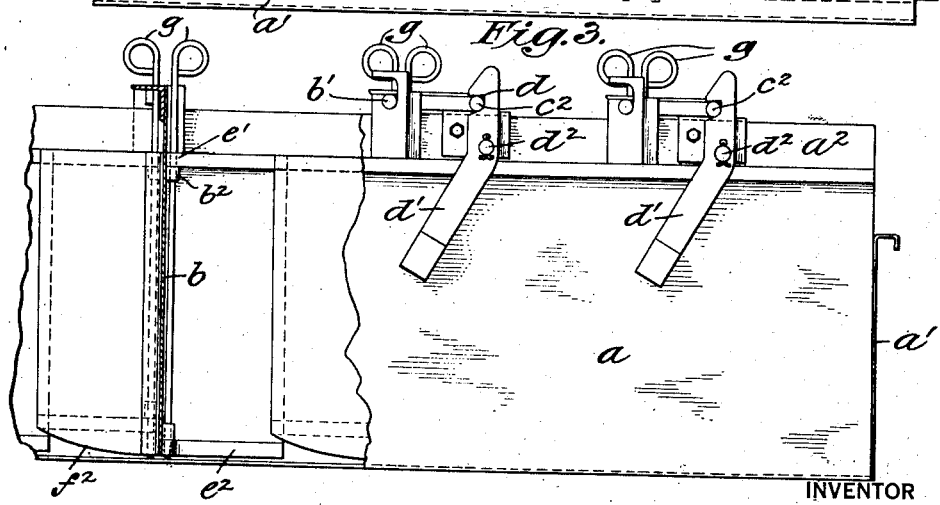
INVENTOR
CHARLES L. NEIN
BY
Redding, Greeley, O'Shea & Campbell
his ATTORNEYS Jan. 18, 1927.
C. L. NEIN
DUMP BODY
Filed July 15, 1925
1,615,131
2 Sheets-Sheet 2
Fig. 4.
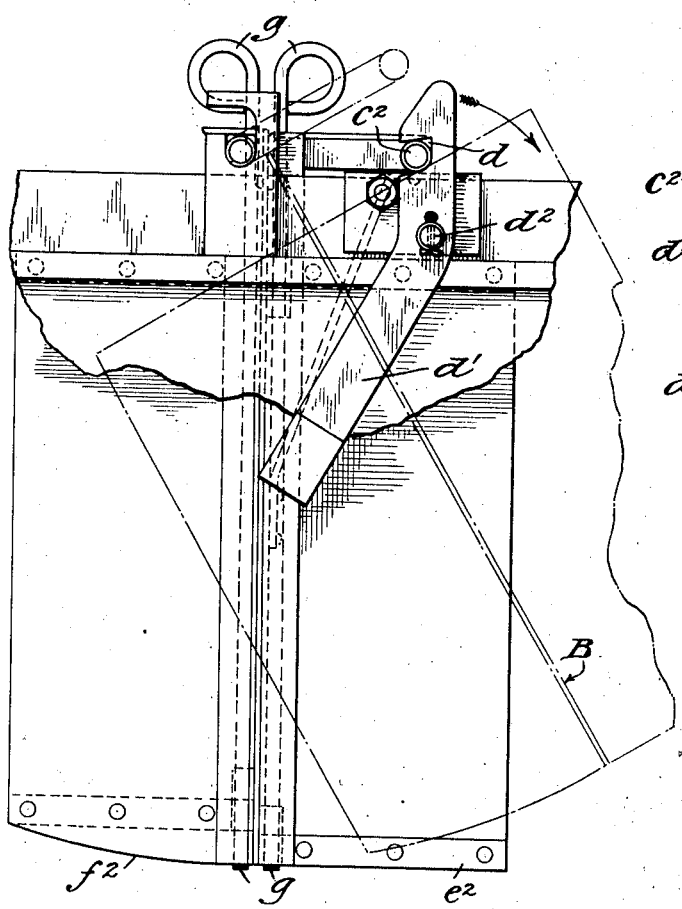
Fig. 5.
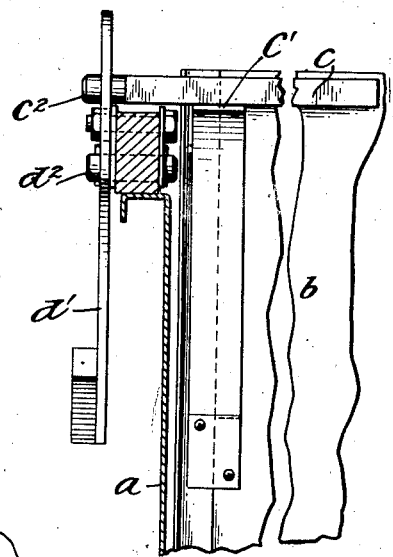
Fig. 6.
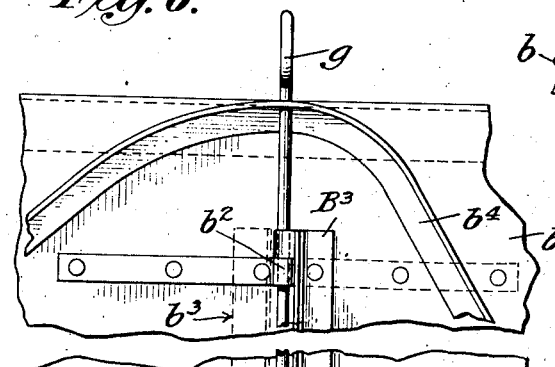
Fig. 7.
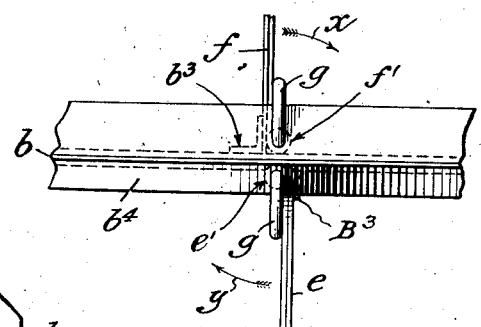
INVENTOR
CHARLES L. NEIN
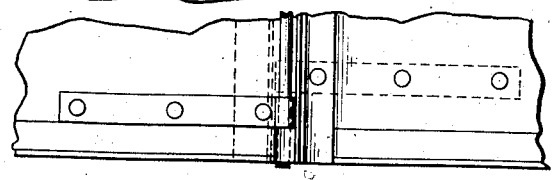
his ATTORNEYS Patented Jan. 18, 1927.

1,615,131

UNITED STATES PATENT OFFICE.

CHARLES L. NEIN, OF NEW YORK, N. Y., ASSIGNOR TO INTERNATIONAL MOTOR COMPANY, OF NEW YORK, N. Y., A CORPORATION OF DELAWARE.

DUMP BODY.

Application filed July 15, 1925. Serial No. 43,662.

In the U. S. patent to Josiah E. Reid and Charles L. Nein No. 1,491,545 dated April 22, 1924, there is disclosed a gate for dumping bodies and the locking mechanism therefor which gate is designed primarily with reference to its use as a partition for such a body which is characterized by fewness of parts, simplicity of construction and arrangement, ease in assembling and disassembling and certainty of operation through the positive nature of the latching elements. The latching devices disclosed are readily operated by hand and normally free from the action of unbalanced forces, particularly at the instant of release, such as in known constructions make the release of the gates under pressure a somewhat difficult and hazardous operation. The patented latch is automatically engageable with the gate when the body is lowered to position on the chassis. Obviously a plurality of such gates may be disposed within the body of a dump truck whereby a plurality of predetermined loads may be distributed as desired. The present invention has for its object to further subdivide the interior of a body of a dump truck whereby a greater number of compartments are afforded for the accommodation of varying contents. To this end partitions are removably secured to the respective gates whereby the space between successive gates is sub-divided. The partitions are so formed as not to interfere with the free movement of the gates in dumping. The invention also has to do with the provision of partitions which are practical from the standpoint of manufacture and use and which may be conveniently handled and stored.

These and other objects of the invention will be described with greater particularity hereinafter in connection with a preferred embodiment illustrated in the accompanying drawings in which:

Figure 1 is a view in side elevation showing a motor truck provided with a dump body sub-divided according to the present invention.

Figure 2 is a plan view showing a fragmentary portion of the dump body provided with the partitions according to the present invention.

Figure 3 is a view in side elevation looking from the left in Figure 2, parts being removed in the interest of clearness.

Figure 4 is a view showing one of the partitions according to the present invention and its manner of operation.

Figure 5 is a view taken in the plane indicated by the line 5—5 in Figure 2 and looking in the direction of the arrows and showing a fragmentary portion of the side wall of the dump body and partition and the latch therefor.

Figure 6 is a view taken in the plane indicated by the line 6—6 in Figure 2 and looking in the direction of the arrows and showing a fragmentary portion of one of the partitions.

Figure 7 is a view on an enlarged scale showing the manner of securing the longitudinally extending partitions to a gate.

The improvements are not limited to the particular location or function of the partitions provided nor to the type of gate to which they are applied. In the drawings a dump body formed of the side walls $a$ and the tail gate $a'$ is sub-divided by a plurality of transverse partitions $b$ substantially similar to the gate disclosed in Patent No. 1,491,545. Upon the side walls $a$ there are disposed removable side sills $a^2$ within which are journaled pivots $b'$ by which the gates $b$ are supported. Adjacent one end the gates are provided with latch members each consisting of a bracket $c$ supported by a strap $c'$ and formed with a lug $c^2$ extending beyond the outer marginal surface of the side sill $a^2$ and adapted to be engaged by a notch $d$ formed in one arm of a bent lever $d'$ pivoted as at $d^2$ to the side sill $a^2$. Upon opposite sides of the respective partitions and in the same relative position on each gate there are disposed partition sections $e$, $f$, respectively. These partitions are hingedly connected to the gate by being formed adjacent one edge with eyes $e'$, $f'$, respectively, through which pintle pins $g$ pass which pintle pins also pass through eyes $b^2$ carried with the partition. By means of the hinge connection described, the partitions may be removed when not in use and are adapted to be folded back against the sides of the gates, if desired, to occupy little room when the gates are removed and stacked in storage. However, to permit the partitions to be retained in operative position when desired, means are provided whereby the partitions can only be rotated about their pivot in one direction. Such means may take the form of angle pieces $b^3$, $B^3$, secured adjacent the points of connection. Referring to Figure 7, for instance, an angle $b^3$ is illustrated as secured to the forward face of the gate whereby the partition $f'$ can only move about the pintle pin $g$ in the direction of the arrow $x$, the angle piece $b^3$ serving as a stop against movement in the opposite direction. Similarly angle piece $B^3$ is secured on the opposite face of the gate $b$ to serve as a stop for the partition $e$ whereby said partition can only be rotated about its pintle pin in the direction indicated by the arrow $y$. This construction is particularly simple since by means of only one angle piece at one side and the opposing partition the partition is held in operative position. Each gate may, of course, be suitably re-enforced in any convenient manner. In the illustrated embodiment a curved angle is shown at $b^4$ which not only re-enforces the gate throughout its length but also serves in the uppermost part hereof as a bearing for the pin $g$.

Referring to Figure 2, it will be observed that proximate partitions $e$ and $f$ overlap as indicated and by the overlapping they are rigidly held in extended position. For instance, partition $e$ is only capable of swinging about its pivot in the direction of the arrow $y$ while partition $f$ is only capable of movement in the direction of the arrow $x$. The partitions overlap in such manner that these tendencies toward movement oppose one another and thereby provide a rigid partition.

When the floor of the dump body is inclined when the load is to be dumped the contents of the different compartments may be released by disengaging the pin $c^2$ from the latch $d$ whereupon the partition $b$ will swing to the position indicated in dotted lines at B under the weight of the contents of the compartment. Since the movement of the lower edge $e^2$ of partition $e$ is away from the floor of the vehicle such edge may be straight as indicated. The lower edge $f^2$ of the opposite partition is curved as shown in order that no interference of the lower edge of the partition will occur with the floor when the gate swings.

The construction is particularly useful in carrying materials of different kinds such as sand, gravel and cement whereby predetermined proportions may be dumped simultaneously into one pile for mixing.

While only one series of longitudinally extending partitions is illustrated and such partitions are shown as nearer one side wall of the dump body it will be obvious that any number of such series of such partitions may be used dependent upon the size of compartments desired and that the partitions themselves may be disposed at any point in the length of the tail gate so long as the relative position of the partitions on the respective tail gates remain the same.

What I claim is:

1. In a vehicle body, a transversely extending gate, a longitudinally extending partition upon each side of the gate for co-operation with similar partitions upon other gates, and means including the body for co-operating with the gate to form a closure.

2. In a vehicle body, a transversely extending gate, a longitudinally extending partition pivotally carried upon each side of the gate for co-operation with similar partitions upon other gates, and means including the body for co-operating with the gate to form a closure.

3. In a vehicle body, a transversely extending gate, a longitudinally extending partition pivotally carried upon each side of the gate for co-operation with similar partitions upon other gates, means to prevent pivotal movement of the respective partitions in one direction beyond a predetermined point, and means including the body for co-operating with the gate to form a closure.

4. In a dump body for a vehicle, in combination, a plurality of pivotally mounted transversely extending gates, a longitudinally extending partition removably pivoted upon each side of each gate in overlapping relationship with the partition on the adjacent gate, and limit stops to prevent the pivotal movement of the respective partitions in a direction away from the overlapped partition.

This specification signed this 10th day of July, A. D. 1925.

CHARLES L. NEIN.